(12) United States Patent
Tofaute et al.

(10) Patent No.: US 12,142,779 B2
(45) Date of Patent: Nov. 12, 2024

(54) MOUNTING DEVICE AND METHOD FOR MOUNTING A NUT ON A SCREW OF A BATTERY ASSEMBLY, AND BATTERY ASSEMBLY

(71) Applicant: Webasto SE, Stockdorf (DE)

(72) Inventors: Tobias Tofaute, Stockdorf (DE); Mario Meyer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 573 days.

(21) Appl. No.: 17/442,749

(22) PCT Filed: Mar. 26, 2020

(86) PCT No.: PCT/EP2020/058489
§ 371 (c)(1),
(2) Date: Sep. 24, 2021

(87) PCT Pub. No.: WO2020/193685
PCT Pub. Date: Oct. 1, 2020

(65) Prior Publication Data
US 2022/0181737 A1    Jun. 9, 2022

(30) Foreign Application Priority Data
Mar. 26, 2019 (DE) .......................... 102019107791.5

(51) Int. Cl.
*H01M 50/249* (2021.01)
*H01M 50/262* (2021.01)
(Continued)

(52) U.S. Cl.
CPC ....... *H01M 50/249* (2021.01); *H01M 50/262* (2021.01); *H01M 50/50* (2021.01);
(Continued)

(58) Field of Classification Search
CPC .. H01M 50/249; H01M 50/262; H01M 50/50; H01M 50/503; H01M 50/517;
(Continued)

(56) References Cited

U.S. PATENT DOCUMENTS 9,520,658 B1    12/2016  Schmit et al.
2012/0309239 A1*  12/2012  Onoda ................. H01R 11/284
                                                     439/766

FOREIGN PATENT DOCUMENTS

CN    102782946 A    11/2012
FR    2983270 A1    5/2013
(Continued)

OTHER PUBLICATIONS

International Search Report for PCT/EP2020/058489 mailed on May 29, 2020.

*Primary Examiner* — Matthew W Van Oudenaren
(74) *Attorney, Agent, or Firm* — Concept IP LLP; Michael Zarrabian

(57) ABSTRACT

The present invention relates to a mounting device for mounting a nut on a screw of a battery assembly, comprising a mounting body having a receptacle extending continuously in a longitudinal direction for receiving the nut, and a holding element extending radially inwardly in the receptacle for holding the nut in a pre-mounting position distanced from the screw as well as a battery assembly comprising the mounting device.

18 Claims, 3 Drawing Sheets

(51) Int. Cl.
*H01M 50/50* (2021.01)
*H01M 50/503* (2021.01)
*H01M 50/517* (2021.01)

(52) U.S. Cl.
CPC ....... *H01M 50/503* (2021.01); *H01M 50/517* (2021.01); *H01M 2220/20* (2013.01)

(58) Field of Classification Search
CPC .......... H01M 2220/10; H01M 2220/20; H01R 11/283; F16B 37/044
See application file for complete search history.

(56) References Cited

FOREIGN PATENT DOCUMENTS

| | | | |
|---|---|---|---|
| JP | 2011165611 | A | 8/2011 |
| JP | 2017199578 | A | 11/2017 |
| WO | 2011099652 | A1 | 8/2011 |

\* cited by examiner

MOUNTING DEVICE AND METHOD FOR MOUNTING A NUT ON A SCREW OF A BATTERY ASSEMBLY, AND BATTERY ASSEMBLY

CROSS-REFERENCE TO RELATED APPLICATIONS

This application is a 35 U.S.C. § 371 National Stage Entry of International Application No. PCT/EP2020/058489 filed Mar. 26, 2020, which claims the priority benefit of German Patent Application Serial Number DE 102019107791.5 filed Mar. 26, 2019, all of which are incorporated herein by reference in their entirety for all purposes.

TECHNICAL FIELD

The present invention relates to a mounting device and a method for mounting a nut on a screw of a battery assembly, and to a battery assembly, such as a vehicle battery assembly.

BACKGROUND

In the field of battery assemblies, for example vehicle batteries, it is known to assemble them from a plurality of battery modules, wherein the individual battery modules can in turn have a plurality of battery cells. In order to electrically connect the individual battery modules or the battery cells to each other, it is known to use busbars, which serve as a central distributor of electrical energy.

For this purpose, it is known to provide a bore in the busbar, through which bore a threaded region of a screw is inserted, and then to fix the busbar by means of a nut which is mounted on the threaded region of the screw and thus on the screw. In this context, the term screw is understood to mean both a screw as an individual part and a threaded bolt or a threaded pin extending in one piece from a lower part, for example a battery module or a further busbar. On the one hand, a mechanical fixation of the busbar can be achieved by this screw connection. Furthermore, the screw connection can also be provided for establishing electrical contact.

In order to establish an electrical contact of the busbar, either as described above via the screw connection, or alternatively or additionally by means of contact surfaces between, for example, a base surface of a battery module or battery cell contact, or a further busbar and the busbar to be mounted, the busbar has bare, electrically conductive contact surfaces in the region in which the electrical contact is to be made, even if the rest of the busbar is electrically insulated by an electrically insulating coating.

In order to prevent or at least reduce the risk of unintentional short circuits or injuries to a person carrying out the mounting during the mounting process, additional effort is therefore required to protect the components of the battery assembly and to protect the persons and technical equipment involved in the mounting of the battery assembly, which is reflected in increased mounting time and additional devices to improve functional safety and occupational safety.

In particular to protect the person carrying out the mounting process, it is known to provide the busbars to be connected with multi-part modules which surround the electrically conductive parts of the busbar and shield them from the surrounding environment in such a way that the person cannot come into contact with the electrically conductive parts or can only do so with difficulty. Such an elaborately constructed modular connector can be found, for example, in DE 10 2017 210 425 A1.

It is also known to surround the busbar around its contact surface with an electrically insulating collar, which surrounds the nut or a screw head of the screw connection at the edge, as known for example from DE 10 2012 018 086 A1. Although this provides at least a certain additional protection against accidental short circuits or contact of the person carrying out the mounting process with the contact surface, the screw or the nut must be inserted into the collar by hand by the person in order to thread the nut onto a threaded region of the screw, for example. In so doing, the nut may slip out of the person's hand and fall into regions of the battery that are no longer freely accessible, for example. In addition, if the screw is already electrically contacted, as is often the case, the person may receive an electric shock when fitting the nut, for example if the protective clothing, in particular the protective gloves, are not in sound condition. The person is therefore still exposed to a certain health risk during the mounting process.

DISCLOSURE OF THE INVENTION

Proceeding from the known prior art, it is an object of the present invention to provide an improved mounting of a nut on a screw of a battery assembly, in particular a simplified and/or safer mounting of a nut on a screw of a battery assembly.

The object is achieved by a mounting device for mounting a nut on a screw of a battery assembly having the features of claim 1. Advantageous refinements will become clear from the dependent claims, the description and the figures.

Accordingly, a mounting device for mounting a nut on a screw of a battery assembly is suggested, comprising a mounting body having a receptacle extending continuously in a longitudinal direction for receiving the nut, and a holding element extending radially inwardly in the receptacle for holding the nut in a pre-mounting position distanced from the screw.

Since the mounting device comprises a mounting body with a receptacle extending continuously in a longitudinal direction for receiving the nut, and a holding element extending radially inwardly in the receptacle for holding the nut in a pre-mounting position at a distance from the screw, a person carrying out the mounting process no longer has to handle the relatively small nut alone in order to mount the nut, but can use the mounting device, which is larger than the nut, to place the nut over the screw. Furthermore, the fact that the nut is held in the mounting device by the holding element can prevent the person from dropping the nut during the mounting process, for example into regions of the battery that are no longer accessible.

Furthermore, in addition to the aspect of easier handling, occupational safety can also be increased by the mounting device. By holding the nut in the pre-mounting position at a distance from the screw, the nut and the screw are not in direct contact, so the nut is electrically insulated from the screw in the pre-mounting position.

When the mounting device is fitted on the screw or the busbar, the nut held in the mounting device in the pre-mounting position can be pre-positioned relative to the screw, wherein the nut is preferably held in the longitudinal direction of the screw above the latter in the pre-mounting position. A person carrying out the mounting process thus only has to bring a corresponding tool, for example a spanner or a socket wrench, for example an external hex socket or an internal hex socket, into engagement with the nut from above, i.e. in the longitudinal direction of the screw from a side of the mounting device opposite the screw, i.e. a free side of the mounting device, to bring the nut into contact with the screw by pressing down in the direction of the screw, and to screw it onto the screw.

Furthermore, the mounting device provides electrical insulation of the nut with respect to the screw and, for example, one or more busbars fastened by the screw connection until the nut is deliberately mounted on the screw. Furthermore, a person carrying out the mounting of the nut no longer has to hold the nut directly for the mounting process, but only has to touch the mounting device for a pre-positioning of the nut relative to the screw required for the mounting, so that the risk of receiving an electric shock by holding the nut directly during a mounting process can be significantly reduced or even completely avoided.

The aforementioned mounting device can thus, on the one hand, increase the mounting safety and protection of the person responsible for the mounting, thus the occupational safety for carrying out the mounting process, and, on the other hand, simplify the mounting of the nut compared to a conventional mounting process, in particular by simplified handling, in which the risk of dropping or losing the nut during the handling of the nut is reduced, so that, among other things, the mounting time can also be reduced compared to conventional mounting methods without such a mounting device.

This also eliminates the need for complex and costly multi-part arrangements to protect the person carrying out the mounting process and to protect against short circuits, without increasing the risk to the person carrying out the mounting process and the risk of accidental short circuits. Consequently, the costs can also be reduced compared to conventional contacting designs.

Preferably, the nut is held relative to the mounting body in the pre-mounting position by means of a minimum pitch circle inner diameter of the holding element being smaller than a maximum pitch circle outer diameter of the nut.

The nut can further preferably be received in the receptacle by means of a minimum pitch circle inner diameter of the receptacle being larger than the maximum pitch circle outer diameter of the nut.

Preferably, holding the nut distanced from the screw in the pre-mounting position can be achieved by arranging the holding element at a distance from a mounting side facing the busbar, such that the nut is held by the holding element in the pre-mounting position distanced from a mounted position of the nut on the screw in the longitudinal direction.

Preferably, the receptacle is cylindrical in relation to the longitudinal direction.

According to a preferred embodiment, the mounting device further comprises a connection unit extending from the mounting body for connecting to a busbar to be fixed by the nut. This allows the mounting device to be positioned relative to the busbar and thus relative to the screw extending from the busbar, so that the nut can already be pre-positioned exactly over the screw in the pre-mounting position. This can further facilitate the mounting of the nut on the screw.

In addition, by connecting the mounting device to the busbar, the mounting device, in particular the mounting body, can serve as a cover for the screw and the region of the screw connection on the nut side after mounting of the screw. This eliminates the need for a cap, which is required in conventional screw connections to electrically insulate the screw connection on the nut side, and which must be fitted on the nut once the mounting process has been performed.

Such caps tend to detach from the nut due to vibrations, such as those that occur when a vehicle is moving. On the one hand, this means that the nut or the screw connection is no longer insulated on the nut side. In addition, the cap can fall around in the battery housing after detaching and, for example, can contribute to the detachment of other caps or even the damage of sensitive parts of the battery assembly. Consequently, in addition to assisting the mounting process, a mounting device constructed in this way can also provide a permanent cover or insulation for the nut after mounting. At the same time, the number of loose components in the battery assembly can be reduced.

According to a further preferred embodiment, the connection unit has a snap hook or clip for forming an undercut connection to the busbar, wherein the connection unit, with respect to a center axis of the mounting body, preferably has two snap hooks or clips arranged at a distance from one another on both sides of the center axis. This makes it possible to push the mounting device onto the busbar in a simple manner, wherein the snap hook or clip, or the snap hooks or clips, form an undercut connection with a correspondingly formed part of the busbar. The undercut connection can provide a permanent connection and reliable and faithful positioning of the mounting device on the busbar and thus around the mounted nut.

Preferably, the connection unit is formed integrally with the mounting body.

Preferably, the connection unit extends from the mounting body radially outwardly with respect to the longitudinal direction. The mounting unit can thus be attached to the busbar to the side of the mounting body or the region of the screw connection. The connection unit can therefore be constructed in such a way that it does not extend substantially in the region of the screw connection or in a region in which the portions to be assembled, for example two busbars, extend.

In order to be able to provide a particularly compact structure of the mounting device, the connection unit can optionally alternatively or additionally extend from the mounting body in the longitudinal direction in the direction of the busbar on a mounting side of the mounting body facing the busbar in a mounted state on the busbar.

According to a further preferred embodiment, the holding element has an elastic collar which is inclined toward the mounting side and extends in a circumferential direction relative to the longitudinal direction, wherein the collar preferably has a substantially rotationally symmetrical structure with respect to the longitudinal direction. As a result, simple and reliable holding of the nut by the holding element can be achieved.

Preferably, the holding element, preferably the collar, is formed in one piece with the mounting body. In this way, a particularly simple structure of the mounting device can be achieved.

If the holding element is formed by a plurality of collar segments distanced from one another in the circumferential direction, in accordance with a further preferred embodiment, the holding element can exhibit increased elasticity, for example in comparison with a holding element which has a fully continuous collar. The fact that the individual collar segments are separated from one another in the circumferential direction means that they can be displaced or elastically deformed more easily from their initial position, for example by pushing in the nut, with their free end radially outwards, since there are no forces restraining this deformation in the circumferential direction.

In addition to elastic deformation, the collar or collar segments may also be plastically deformable.

According to a further preferred embodiment, the holding element has two collars arranged offset from one another in the longitudinal direction. This can further increase the positional accuracy of the nut with respect to the pre-mounting position. Furthermore, the collars arranged offset from one another can preferably form a flange receptacle in which, for example, a flange of a nut, preferably a hexagon nut with flange, for example designed in accordance with ISO 4161 or DIN 6923, can be received (also known as a "cap nut").

Preferably, the first collar and the second collar are arranged here such that their minimum pitch circle inner diameter is smaller than the maximum outer diameter of the flange and larger than the maximum outer pitch circle diameter of the main body of the nut. In other words, the nut with collar is then held by the holding element merely by holding the flange of the nut. Moreover, a substantially centric alignment of the nut with respect to a center axis in the longitudinal direction of the mounting body or the recess can thus be achieved in a simple manner.

According to a further preferred embodiment, the collars are each formed by a plurality of circumferentially mutually distanced collar segments, wherein the collar segments of the first collar preferably extend recesses of the second collar present between the collar segments of the second collar present, wherein preferably the collar segments of the first collar and the collar segments of the second collar partially overlap in the longitudinal direction. This allows the flange receptacle to be more compact in the longitudinal direction. In other words, an upper contacting of the flange provided by the upper of the two collars and a lower contacting of the flange provided by the lower of the two collars can be arranged closer to each other in the longitudinal direction than would be the case if the collar segments did not overlap in the longitudinal direction.

According to a refinement, the first collar and the second collar are formed such that a flange receptacle for receiving a flange of a nut is formed between the collars.

Preferably, the mounting device is formed in one piece. This means that the manufacturing effort of the mounting device can be kept particularly low.

If the mounting device has an electrically insulating material, preferably a plastic material, particularly reliable electrical insulation of the nut can be provided before, during and after the mounting process.

The length of the mounting body in the longitudinal direction and/or the size of the receptacle, in particular a radial extension of the receptacle with respect to the longitudinal direction, are preferably selected such that persons cannot reach the nut with a finger when the nut is in the position mounted on the screw. This enables the mounting device to provide mechanical protection against contact and/or protection against electrical contact, i.e. electrical insulation.

Preferably, the shape of the mounting body and the receptacle, as well as the holding element, if applicable, are designed in accordance with the specifications of the Machinery Directive 2006/42/EC and/or the Low Voltage Directive 2014/35/EU.

The above-mentioned object is further achieved by a battery assembly, preferably a vehicle battery assembly, having the features of claim 11. Advantageous refinements of the battery assembly result from the description and the accompanying figures.

Accordingly, a battery assembly, preferably a vehicle battery assembly, is proposed comprising a battery module and/or a battery cell and a busbar electrically conductively connected via a screw connection to a terminal of the battery module and/or the battery cell. The battery assembly is characterized in that a nut of the screw connection is surrounded by a mounting device according to one of the preceding claims.

Since a nut of the screw connection is surrounded by a mounting device according to one of the preceding claims, the effects and advantages described above with respect to the mounting device can be achieved analogously.

The above object is further achieved by a method for mounting a nut on a screw of a battery assembly having the features of claim 12. Advantageous refinements of the method will become clear from the present description and the figures.

Accordingly, a method for mounting a nut on a screw of a battery assembly is proposed, comprising the steps of pre-positioning a nut in a mounting device, applying the mounting device to a busbar of the battery assembly, wherein the nut is held in the pre-mounting position distanced from the screw, and mounting the nut on the screw.

The advantages and effects described with regard to the mounting device can be achieved analogously by the method.

BRIEF DESCRIPTION OF THE FIGURES

Preferred further embodiments of the invention will be explained in more detail by the following description of the figures, which show.

DETAILED DESCRIPTION OF PREFERRED EMBODIMENTS

In the following, preferred embodiments are described on the basis of the figures. In this context, identical, similar or similarly acting elements are provided with identical reference signs in the various figures, and a repeated description of these elements is omitted to some extent in order to avoid redundancies.

Figure 1:
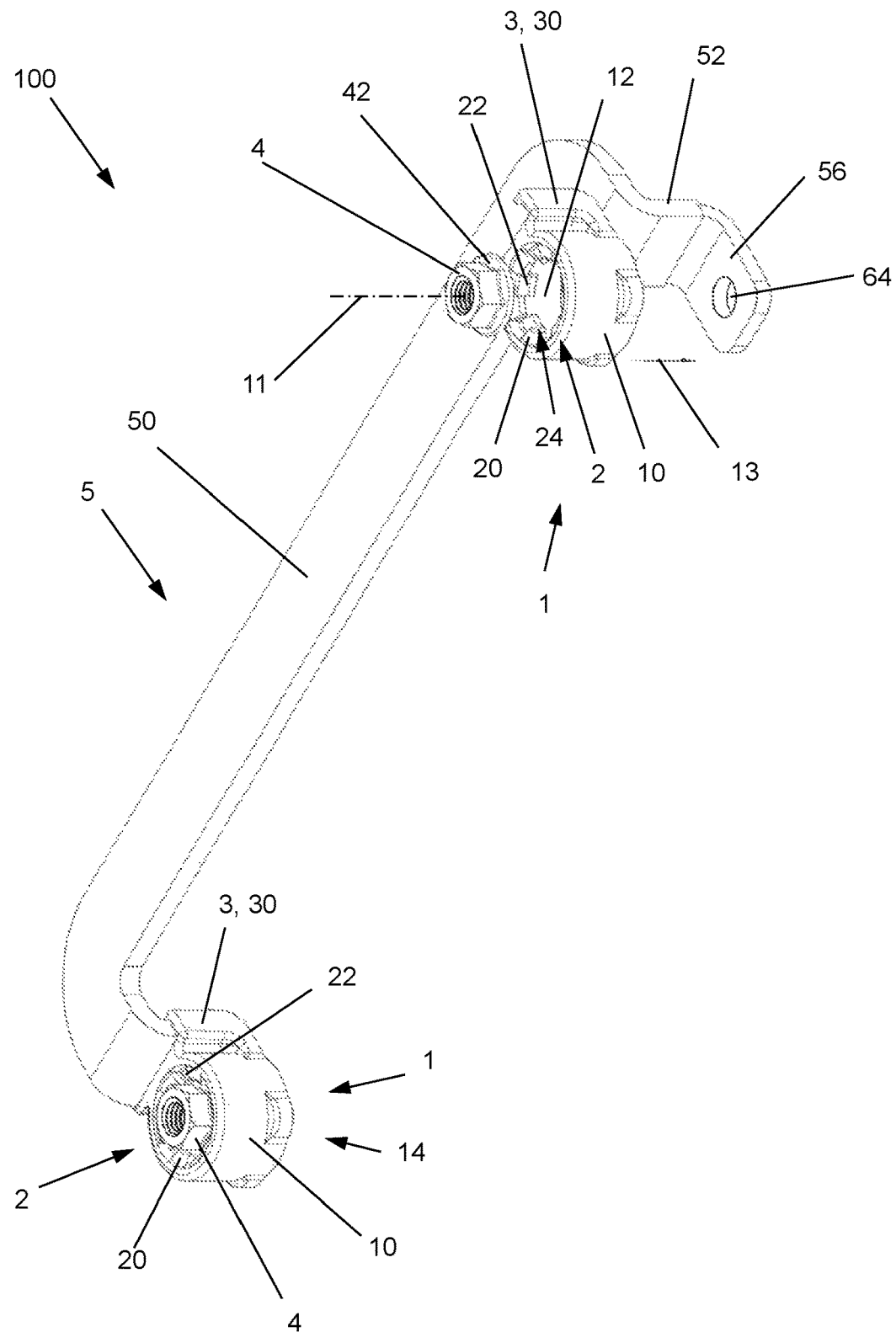
FIG. 1 a schematic perspective side view of a busbar of a battery assembly with two mounting devices for mounting a nut on a screw.

FIG. 1 schematically shows a perspective side view of a busbar 5 in the form of a busbar of a battery assembly 100 with two mounting devices 1 for mounting a nut 4 on a screw. Here, one of the mounting devices 1, which can be seen in the lower left of FIG. 1, is shown in a state connected to the busbar 5. In this mounting device 1, a nut 4 is further held in a pre-mounting position. The mounting device 1, which is shown in the upper right of FIG. 1, corresponds to the aforementioned mounting device 1, wherein the mounting device 1 and the nut 4 are shown in the upper right of FIG. 1 in an exploded view with respect to the busbar 5.

The mounting device 1 comprises a mounting body 10 having a receptacle 12 extending continuously in a longitudinal direction 11 for receiving the nut 4. A holding element 2 extends radially inwardly in the receptacle 12 for holding the nut 4 in the pre-mounting position in which the nut 4 is distanced from the screw, as described in more detail below with respect to FIG. 3.

The mounting device 1 comprises a connection unit 3 extending radially outwardly from the mounting body 10 in relation to the longitudinal direction 11, which connection unit in this case has two clips 30 arranged at a distance from one another on both sides of the center axis of the mounting body 10. The clips 30 are designed in such a way that the mounting device can be pushed onto the busbar 5 in a mounting direction 13, which in this case corresponds to the longitudinal direction 11. For connecting to the connection unit 3, the busbar 5 has a connection portion 52 extending substantially in the longitudinal direction 11. When the mounting device 1 is pushed onto the busbar 5 in the mounting direction 13, the mounting device 1 is consequently clipped onto the connection portion 52 of the busbar 5. The clips 30 thereby form an undercut connection with the connection portion 52, so that the mounting device 1 is fixed in position on the busbar 5. The receptacle 12, which in this embodiment is optionally cylindrical, is arranged in such a way that a center axis of the receptacle 12, which in the present case corresponds to the illustrated longitudinal direction 11, is positioned substantially centrically with respect to a bore 54 in a contacting portion 56 of the busbar 5.

In the present case, the holding element 2 comprises a plurality of circumferentially mutually distanced elastic first collar segments 20 inclined with respect to the longitudinal direction 11 in the direction of a mounting side 14, which accordingly form an elastic first segmented collar inclined with respect to the longitudinal direction 11. Further, the holding element 2 comprises a plurality of circumferentially mutually distanced elastic second collar segments 22 inclined with respect to the longitudinal direction 11 toward the mounting side 14, which correspondingly form an elastic second segmented collar inclined with respect to the longitudinal direction 11.

The plurality of first collar segments 20 are distanced from the plurality of second collar segments 22 in the longitudinal direction 11. In this regard, the first collar segments 20 and the second collar segments 22 partially overlap as viewed in the longitudinal direction 11, wherein the first collar segments 20 extend in correspondingly formed recesses between the second collar segments 22, and, conversely, the second collar segments 22 extend in correspondingly formed recesses between the first collar segments 20.

As a result, a flange receptacle 24 is formed between the plurality of first collar segments 20 and the plurality of second collar segments 22, in which flange receptacle 24 a flange 42 of the nut 4 can be received, as described in more detail with respect to FIG. 3 below.

In the present case, the mounting device 1 is formed in one piece from an electrically insulating plastic material.

As can be seen in the mounted position of the mounting device 1 at the bottom left of FIG. 1, the mounting device 1 covers the contacting portion 56 of the busbar 5 substantially entirely. The mounting device 1 thus constitutes an electrical insulation of the contacting portion 56 of the busbar 5. The mounting device 1 extends here such that it partially overlaps an insulation 50 of the busbar 5, with which the latter is substantially completely coated except in the contacting portions 56. Substantially complete electrical insulation from the surrounding environment can thus be provided for the busbar 5.

Figure 2:
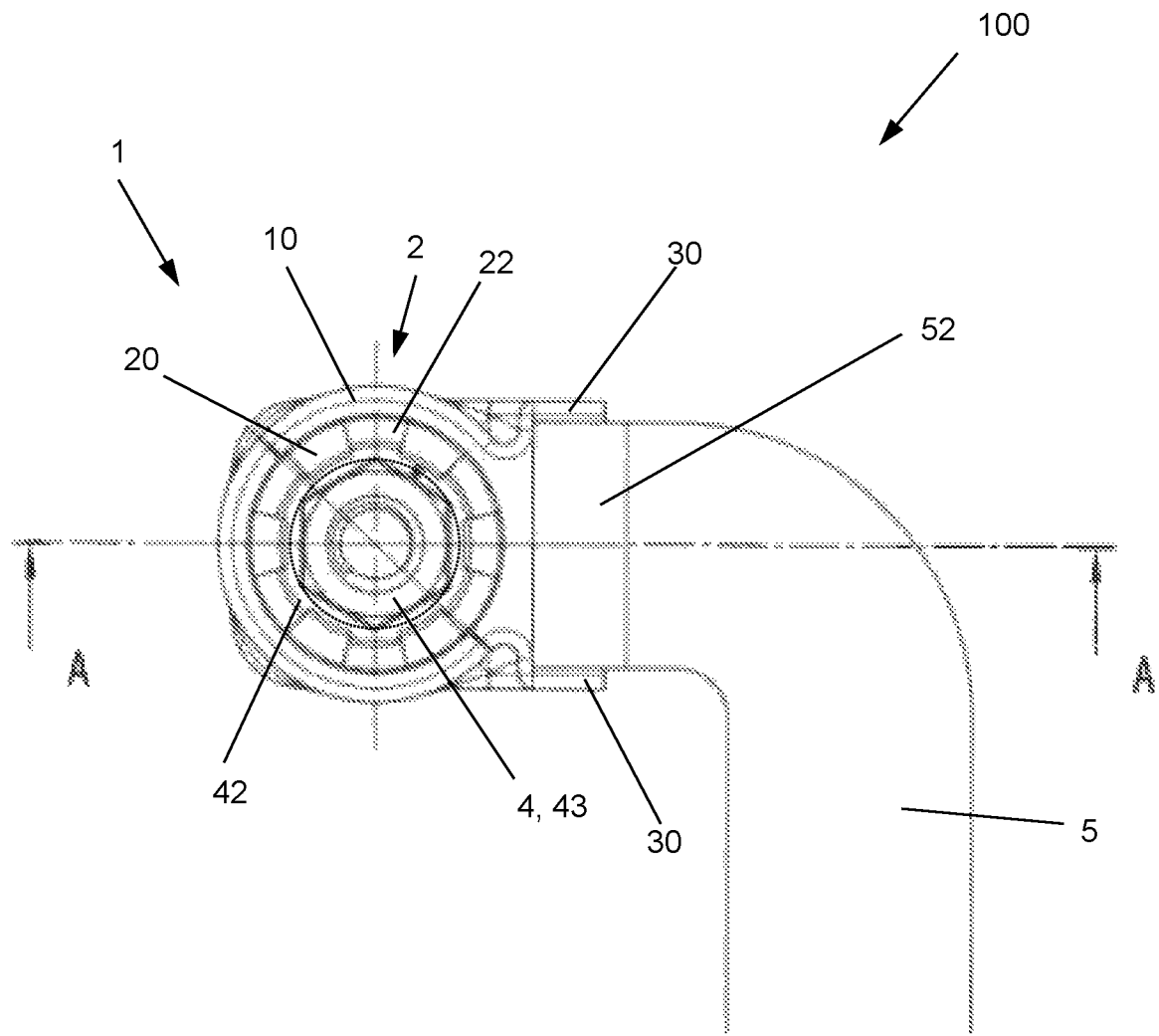
FIG. 2 a schematic top view of a mounting device from FIG. 1.

FIG. 2 schematically shows a top view of a mounting device 1 from FIG. 1. The nut is held here relative to the mounting body in the pre-mounting position optionally achieved by means of a minimum pitch circle inner diameter of the holding element being smaller than a maximum pitch circle outer diameter of the nut.

The nut 4 is able to be received here in the receptacle 12 by means of a minimum pitch circle inner diameter of the receptacle 12 being larger than the maximum pitch circle outer diameter of the nut 4.

The first collar segments 20 and the second collar segments 22 are formed such that their minimum pitch circle inner diameter is smaller than the outer diameter of the flange 42 of the nut 4 and larger than the maximum outer pitch circle diameter of the main body 43 of the nut 4. As described above, the nut 4 is thus held substantially at its flange 42 by the holding element 2.

Furthermore, this makes it possible to place a tool, for example a socket wrench, on the nut 4 in the longitudinal direction 11 from above, i.e. from the side facing away from the mounting side 14, and to engage with the nut without this being significantly impeded by the collar segments 20, 22 of the holding element 2.

Figure 3:
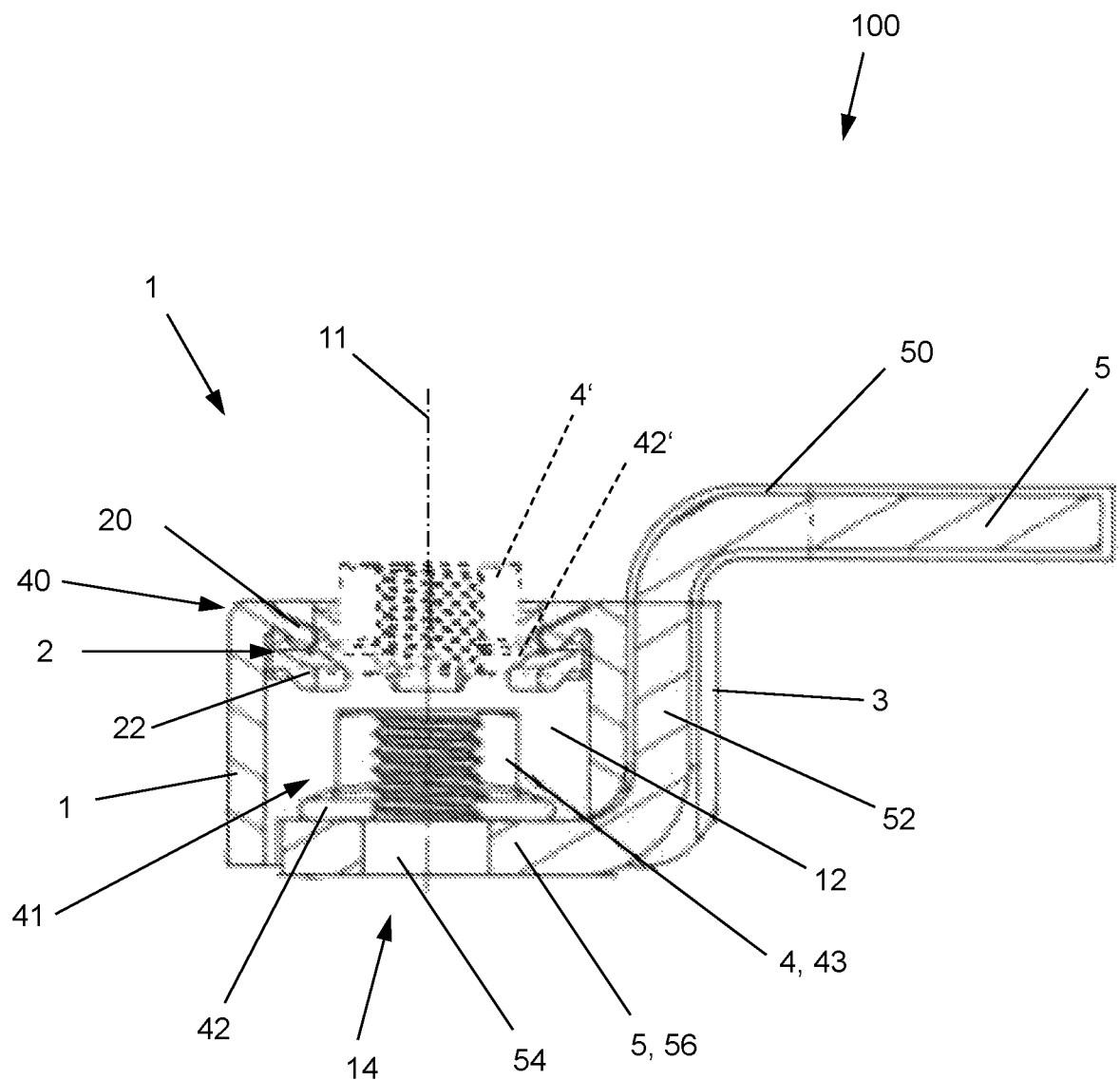
FIG. 3 a schematic sectional view of the mounting device from FIG. 2.

FIG. 3 schematically shows a sectional view of the mounting device 1 of FIG. 2 along the sectional line A-A shown therein. It shows the busbar 5, the mounting device 1 and a representation of the nut 4 in a mounted position 41, in which the nut 4 is screwed onto a screw extending through the bore 54, which is not shown for reasons of clarity. Furthermore, by means of the dashed lines, a nut 4' is shown in the pre-mounting position 40. It can be clearly seen that the nut 4' in the pre-mounting position 40 is distanced in the longitudinal direction 11 from the nut 4 in the mounted position 41. The distance between the pre-mounting position 40 and the mounted position 41 is selected or predetermined in such a way that the nut 4' in the pre-mounting position 40 is distanced from the screw extending through the bore 54.

Preferably, the distance between the nut 4' and the screw in the pre-mounting position 40 is at least 1 mm in the longitudinal direction, particularly preferably at least 1.5 mm, further preferably at least 2 mm, and very particularly preferably at least 3 mm. By selecting the size of this distance, it is possible, for example, to avoid sparking between the screw, which is energized, and the nut 4' held in the pre-mounting position 40.

As already noted above, in the pre-mounting position 40, the mounting device 1 provides the nut 4 with a substantially stationary positioning relative to the bore 54 and thus relative to the screw passing through the bore 54.

To mount the nut 4 onto the screw, the nut 4 can be inserted initially into the mounting device 1 so that the nut 4 is held in the receptacle 12 in the pre-mounting position 40 by the holding element 2. In other words, a sub-assembly of mounting device 1 and nut 4 can be created.

The mounting device 1 provided with the nut 4 in the pre-mounting position 40 can then be clipped onto the busbar 5, as described above, by bringing the clips 30 of the connection unit 3 into engagement with the connection portion 52. As a result, the mounting device 1 is fixedly positioned on the busbar 5, whereby the nut 4 is positioned in the pre-mounting position 40 relative to the bore 54. Thus, in the pre-mounting position 40, the nut 4 is distanced in the longitudinal direction 11 from the screw substantially centrically with respect thereto.

To screw the nut 4 onto the screw, a person carrying out the mounting process only has to push the tool required for this purpose, for example a socket wrench, onto the nut 4 in the longitudinal direction 11 from the top as seen in FIG. 3 and, by exerting pressure on the nut 4 in the longitudinal direction 11, move it from the pre-mounting position 40 downwardly as seen in FIG. 3 toward the contacting portion 56 until the nut 4 comes into contact with the screw. Then, the nut 4 is to be screwed onto the screw in the conventional manner.

Because the collar segments 20, 22 are elastic and inclined with respect to the longitudinal direction 11 in the direction of the mounting side 14, it is possible for the tool to deform the collar segments 20, 22 radially outwardly and, as seen in FIG. 3, downwardly, thus in the direction of the mounting side 14. This means that the tool is not prevented by the holding element 2 from being moved further past the holding element 2 in the longitudinal direction 11.

In addition to elastic deformation of the collar segments 20, 22, the holding element 2 may also be configured to be at least partially plastically deformed by the tool when the nut 4 is applied to the screw by the tool.

After removal of the tool, the mounting device 1 provides a cover for the screw connection and the contacting portion 56 on the side of the nut 4. This can provide electrical insulation as well as contact protection for the nut 4.

Alternatively, the mounting device 1 can also be placed initially on the busbar 5 and can only subsequently be provided with a nut 4, so that the nut 4 is held in the pre-mounting position 40.

The mounting device 1, provided with or without a nut 4, may be fitted onto the busbar 5 before or after the busbar 5 is inserted into the battery assembly 100.

To the extent applicable, any of the individual features shown in the embodiments may be combined and/or interchanged without departing from the scope of the invention.

LIST OF REFERENCE SIGNS

1 Mounting device
10 Mounting body
11 Longitudinal direction
12 Receptacle
13 Mounting direction
14 Mounting side
2 Holding element
20 First collar segment
22 Second collar segment
24 Flange receptacle
3 Connection unit
30 Clip
4 Nut
40 Pre-mounting position
41 Mounted position
42 Flange
43 Main body
5 Busbar
50 Insulation
52 Connection portion
54 Bore
56 Contacting portion
100 Battery assembly

The invention claimed is:

1. A mounting device for mounting a nut on a screw of a battery assembly, comprising a mounting body having a cylindrical receptacle extending continuously in a longitudinal direction for receiving the nut, and a holding element extending from a cylindrical inner wall of the receptacle radially inwardly in the receptacle for holding the nut in a pre-mounting position distanced from the screw when the mounting device is fitted on the screw.

2. The mounting device as claimed in claim 1, comprising a connection unit extending from the mounting body for connecting to a busbar to be fixed by the nut.

3. The mounting device as claimed in claim 2, wherein the connection unit has a snap hook or clip for forming an undercut connection to the busbar.

4. The mounting device as claimed in claim 3, wherein the connection unit extends radially outwardly from the mounting body with respect to the longitudinal direction.

5. The mounting device as claimed in claim 4, wherein the holding element has an elastic collar inclined toward a mounting side and extending in a circumferential direction with respect to the longitudinal direction.

6. The mounting device as claimed in claim 5, wherein the holding element is formed by a plurality of circumferentially mutually distanced collar segments.

7. The mounting device as claimed in claim 6, wherein the holding element has two collars arranged offset from one another in the longitudinal direction.

8. The mounting device as claimed in claim 7, wherein the collars are each formed by a plurality of collar segments distanced from one another in the circumferential direction.

9. The mounting device as claimed in claim 8, wherein a first collar and a second collar are formed such that a flange receptacle for receiving a flange of a nut with a flange is formed between the collars.

10. The mounting device as claimed in claim 9, wherein the mounting device is formed in one piece.

11. The mounting device as claimed in claim 1, further comprising: at least one of: a battery module and a battery cell and a busbar electrically conductively connected via a screw connection to at least one of: a terminal of the battery module and the battery cell, wherein the nut of the screw connection is surrounded by the mounting device.

12. The mounting device as claimed in claim 1,
wherein the nut in the mounting device is configured to be pre-positioned;
wherein the mounting device is configured to be applied to a busbar of the battery assembly; and
wherein the nut is configured to be mounted on the screw.

13. The mounting device as claimed in claim 3, wherein the connection unit extends from the mounting body in the longitudinal direction in the direction of the busbar on a mounting side of the mounting body facing the busbar in a mounted state on the busbar.

14. The mounting device as claimed in claim 8, wherein the collar segments of a first collar extend recesses of a second collar present between the collar segments of the second collar.

15. The mounting device as claimed in claim 14, wherein the collar segments of the first collar and the collar segments of the second collar partially overlap in the longitudinal direction.

16. The mounting device as claimed in claim 10, wherein the mounting device has an electrically insulating material.

17. The mounting device as claimed in claim 16, wherein the electrically insulating material is a plastic material.

18. The mounting device as claimed in claim 11, wherein the battery assembly is a vehicle battery assembly.

* * * * *